United States Patent [19]

Dodds et al.

[11] 4,398,119

[45] Aug. 9, 1983

[54] COATED PHOSPHOR PARTICLES, METHOD, AND CATHODE RAY TUBE SCREEN

[75] Inventors: Robert E. Dodds, San Diego, Calif.; David J. Harrigan, Towanda, Pa.

[73] Assignee: GTE Products Corporation, Stamford, Conn.

[21] Appl. No.: 188,634

[22] Filed: Sep. 19, 1980

[51] Int. Cl.³ ............................................. H01J 29/10
[52] U.S. Cl. ............................ 313/466; 252/301.4 R; 313/473; 427/68; 427/218; 428/403
[58] Field of Search ............... 313/470, 472, 473, 474, 313/466; 252/301.4 R; 427/68, 215, 218; 428/207, 210, 403

[56] References Cited

U.S. PATENT DOCUMENTS 3,114,065 12/1963 Kaplan .................................. 313/472
3,989,977 11/1976 Ashizaki ........................... 313/473 X
4,128,674 12/1978 Hedler .............................. 313/466 X Primary Examiner—Eugene R. LaRoche
Attorney, Agent, or Firm—J. Theodosopoulos

[57] ABSTRACT

Red cathode ray phosphors are coated with a vapor deposited layer of cadmium selenide in order to achieve controlled color shifts in the light output of the phosphors. Such coated phosphors are especially suited for color television and monitor applications.

10 Claims, 2 Drawing Figures

COATED PHOSPHOR PARTICLES, METHOD, AND CATHODE RAY TUBE SCREEN

CROSS-REFERENCE TO RELATED APPLICATION

Copending application Ser. No. 970,701, assigned to the present assignee, describes and claims pigmented phosphor particles wherein the pigment particles are dispersed in a layer of an alkali or ammonium silicate glass.

Copending application Ser. No. 188,633, filed, concurrently herewith, and assigned to the present assignee, describes and claims a cathode ray tube screen employing a vapor deposited cadmium selenide layer.

BACKGROUND OF THE INVENTION

This invention relates to coated phosphor particles, and more particularly relates to such particles having vapor-deposited coatings, and also relates to a method for producing such coated particles, and to cathode ray tube screens incorporating such particles.

Recent interest in color shifting of cathode ray phosphors, is directed toward increasing the visual contrast of the image on a television cathode ray tube screen. Such color shifting of T.V. phosphors is generally accomplished by the addition or adjustment of dopant materials in the phosphor material, or by coating the individual phosphor particles with a pigment, such as by precipitation from a solution or slurry. Such coatings accomplish the desired color shift by selectively absorbing or filtering a portion of the light output of the phosphor particles. Of course, a corresponding loss of brightness is traded for the achievement of the desired color shift. An added benefit is also sometimes realized in that the pigment changes the body color of the phosphor particles from a light reflective color to a more absorptive (darker) color, thereby further enhancing visual contrast of the screen, especially in the presence of significant ambient light.

Typically in a tri-color cathode ray tube for color television having dots or stripes of red, blue and green phosphors on the cathode ray tube screen, the red and blue phosphors are pigmented. Typical red pigment materials are cadmium sulfo-selenide, red iron oxide and certain rare earth phosphates. A typical blue pigment is cobalt aluminate.

One method of producing such pigmented particles is described in U.S. Pat. No. 3,275,466, wherein the phosphor particles are immersed in a solution of gelatin to coat the particles. The gelatin-coated particles are then agitated in a suspension of pigment particles which are one to two orders of magnitude smaller in size than the phosphor particles. The filter particles cling to the phosphor particles, giving a partial coverage of the surface.

Another method of producing such coated particles is described in U.S. Pat. No. 3,875,449, wherein there is formed a water suspension of the pigment and phosphor particles, followed by mixing, filtering, drying and heat treating to sinter. The sintering is said to form a monolithic layer of pigment covering the entire phosphor particle.

Another method of producing such coated particles is described in U.S. Pat. Nos. 4,020,231, and 4,128,674, wherein the addition of a base or salt to an aqueous mixture of phosphor particles, pigment particles and colloidal silica or pyrophosphate results in gelling of the mixture and co-precipitation of the pigment and colloidal particles on the phosphor particles.

In U.S. Pat. No. 3,886,394, phosphor particles are covered with a gelatin layer, for example, polyvinyl pyrrolidone, having particles of pigment and silica dispersed therein. In U.S. Pat. No. 4,021,588, a filter material is precipitated directly onto the phosphor particles, and the particles are then sintered to adhere the filter particles to the surfaces thereof. Finally, in U.S. Pat. No. 4,049,845, filter particles are adhered to the surfaces of phosphor particles by means of coagulating colloidal particles of latex from a suspension surrounding the particles therein.

The above coating techniques in general result in coatings which are of uneven thickness or discontinuous, or both. Such techniques typically also rely upon a binder material to adhere the pigment particles to the surface, which binder has light absorptive properties of its own, thus further reducing light output.

In the '449 patent, a monolithic coating of even thickness is said to be achieved by sintering. However, such sintering must be carried out under closely controlled conditions, to avoid sintering together of the phosphor particles into a mass, which must then be reduced again to particulate form, such as by crushing, milling and screening. Such operations could damage the pigment coatings.

SUMMARY OF THE INVENTION

In accordance with the invention, a composite article of manufacture comprises a phosphor particle and a continuous coating of a vapor deposited layer of a color-modifying material on the surface of the particle.

Such layer is achieved, in accordance with the invention, by rotating phosphor particles to be coated in a vacuum chamber while vapor depositing the color modifying material on the rotating particles. Such technique results in a continuous coating of uniform thickness, which thickness may vary over a wide range, from several angstroms to several thousand angstroms, by control of the vapor deposition conditions, thus allowing control of color shift-to-brightness ratio. Such thickness is controllable to within $\pm 100$ Å angstroms.

In a further embodiment, a cathode ray tube screen comprises a faceplate and an array of elemental areas supported by the faceplate, the areas comprising of coated particles of cathode ray phosphors, distributed in a matrix of a photo-resist, the phosphor particles having a continuous coating of a vapor deposited layer of a light modifying material on the surface of the particles.

BEST MODE FOR CARRYING OUT THE INVENTION

Figure 1:
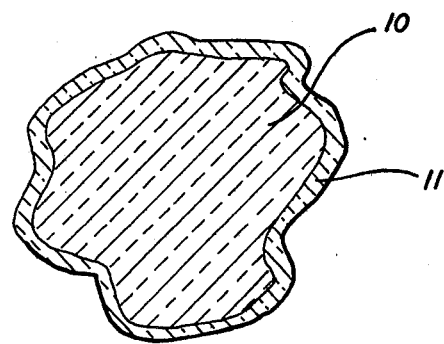
FIG. 1 is a cross section of a phosphor particle of the invention having its surface coated with a vapor deposited layer of a light modifying material.

For a better understanding of the present invention, together with other and further objects, advantages and capabilities thereof, reference is made to the following disclosure and appended claims in connection with the above-described drawings.

The phosphor particles may be of any phosphor material, although it is preferred to use cathode ray phosphors, that is, phosphors which upon excitation by cathode rays emit radiation of a wavelength suitable for the envisioned application. Typical red cathode ray phosphors are europium-activated yttrium oxide, europium-activated yttrium oxysulfide and europium-activated yttrium orthovanadate. Typically, the blue phosphor is silver activated zinc sulfide, and the green is copper-aluminum-activated zinc-cadmium sulfide, although copper-aluminum-activated zinc sulfide, as processed in U.S. Pat. No. 4,038,205, may also be used.

The color-modifying material must be capable of being vapor deposited and must of course exhibit the desired light modifying properties. Examples of suitable materials include: (red) cadmium selenide, cadmium sulfo selenide (CdSSe), iron oxide ($Fe_2O_3$), and copper oxide, ($Cu_2$); (blue) coblat aluminate ($CoAl_2O_4$), Prussian Blue $Fe_4[Fe(CN_6)]_3$ and Peacock Blue ($HSO_3C_6H_4COH[C_6H_4N(C_2H_5)CH_2C_6H_4SO_3Na]_2$); and (green) $Co_xNi_xTi_xZN_x$.

The vapor deposition can be carried out conventionally, such as by placing a resistance-heated crucible containing the material to be vapor deposited together with the particles to be coated inside a bell jar, or similar vessel and evacuating the bell jar to a vacuum of at least $2 \times 10^{-5}$ torr, using, for example, a well trapped oil diffusion pumped system. When the vacuum has been achieved, the crucible is slowly heated to a temperature that will allow the charge to evaporate. Rapid heating is not desirable since the charge tends to dissipate unevenly and is thus difficult to control.

During application of the coating, the phosphor particles must be turned to continuously expose new surfaces to the vapor deposit. A convenient way of achieving this is to spread the particles to be coated in a container and then to subject the container to mechanical vibration. The vibration can be achieved, for example, by means of a transducer attached to the bottom of the container and subjected to an alternating current source. When the evaporation has been completed, the bell jar is allowed to return to atmospheric pressure, and the coated particles are removed.

The thickness of the coating can be closely controlled simply by controlling the time of vapor deposition. Obtaining samples for varying deposition times, keeping other conditions such as temperature, heating rate and vacuum level constant, and measuring the thickness of the resultant coatings will enable a time vs. thickness calibration curve for that set of deposition conditions.

As above stated, the thickness of the coating will depend upon the degree of color shift desired, greater thicknesses resulting in greater absorption of the light output of the phosphor. Of course, such consideration must be balanced against the loss of overall brightness of the phosphor, which should be minimized by having the coating as thin as possible consistent with the achievement of the desired color shift.

In general, thicknesses of from about 2 to 10,000 angstroms are achievable, and will result in a noticeable color shift of the light output of the phosphor, with tolerable reductions in overall brightness.

EXAMPLE

A quantity of $Y_2O_3$:Eu red-emitting phosphor was placed in a rotatable dish inside a bell jar, and a charge of CdSSe was placed in a basket a distance of five inches from the dish. The bell jar was sealed and evacuated to pressure of less than $2 \times 10^{-5}$ torr. The dish was rotated and vibrated (by means of a transducer attached to the bottom of the dish) while the charge was resistance heated to a temperature within the range of about 1400° C. to 1550° C. to initiated vapor deposition.

Deposition was continued for about 45 seconds, resulting in a coating thickness on the phosphor particles of about 1000 Angstroms.

In general, coating thicknesses of from ten to 2000 Angstroms may be obtained by heating within the range of 1400° C. to 1550° C. for from 10 seconds to two minutes.

Figure 2:
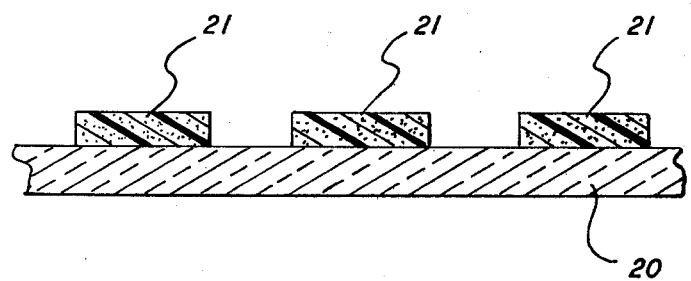
FIG. 2 is a section view of a cathode ray tube faceplate 20 supporting a plurality of stripes 21, each stripe comprising a plurality of the coated phosphor particles of FIG. 1 supported in a photosensitive matrix.

Referring now to FIG. 2, there is shown an article of manufacture including an array of a plurality of stripes of a photosensitive matrix material, such as dichromated polyvinyl alcohol photoresist, supporting coated phosphor particles, the stripes supported by a screen substrate such as a cathode ray tube faceplate. Such stripes are preferably formed by exposing an integral photoresist layer selectively with a pattern of light corresponding to the pattern of stripes desired to be formed on the faceplate. Subsequently, a developer removes the unexposed portions of the photoresist including the phosphor particles supported therein, and leaves the stripes which had been insolubilized to the developer by the light exposure.

While there has been shown and described what are at present considered the preferred embodiments of the invention, it will be obvious to those skilled in the art that various changes and modifications may be made therein without departing from the scope of the invention as defined by the appended claims.

INDUSTRIAL APPLICABILITY

Red cathode ray phosphors are coated with a vapor deposited layer of cadmium selenide in order to achieve controlled color shifts in the light output of the phosphors. Such coated phosphors are especially suited for color television and monitor applications.

We claim:

1. A composite article of manufacture comprising a phosphor particle and a continuous coating on the surface of the particle, characterized in that said coating comprises a vapor deposited layer of a color modifying material having a substantially uniform thickness.

2. The article of claim 1 wherein the phosphor particle is a red-emitting cathode ray phosphor selected from the group consisting of europium-activated yttrium oxide, europium-activated yttrium oxysulfide, and europium-activated yttrium orthovanadate.

3. The article of claim 1 wherein the color modifying material is a red pigment.

4. The article of claim 3 wherein the color modifying material is cadmium sulfoselenide.

5. The article of claim 1 wherein the thickness of the layer is within the range of from about 2 to 10,000 Angstroms.

6. An article of manufacture comprising a cathode ray tube faceplate and an array of elemental areas on the faceplate, the areas comprising coated particles of a cathode ray phosphor distributed in a matrix of a photoresist, characterized in that the particle coating comprises a vapor deposited layer of a color modifying material.

7. The article of claim 6 wherein the phosphor particle is a red-emitting cathode ray phosphor selected from the group consisting of europium-activated yttrium oxide, europium-activated yttrium oxysulfide, and europium-activated yttrium orthovanadate.

8. The article of claim 6 wherein the color modifying material is a red pigment.

9. The article of claim 6 wherein the color modifying material is cadmium sulfoselenide.

10. The article of claim 6 wherein the thickness of the layer is within the range of from about 2 to 10,000 Angstroms.

* * * * *